United States Patent [19]
Kim

[11] Patent Number: 5,982,976
[45] Date of Patent: Nov. 9, 1999

[54] DIGITAL VIDEO SIGNAL PROCESSING APPARATUS

[75] Inventor: Yong-je Kim, Suwon, Rep. of Korea

[73] Assignee: Samsung Electronics Co., Ltd., Kyungki-do, Rep. of Korea

[21] Appl. No.: 08/885,773

[22] Filed: Jun. 30, 1997

[30] Foreign Application Priority Data

Jul. 25, 1996 [KR] Rep. of Korea ................. 96-30457

[51] Int. Cl.⁶ ............................. H04N 5/93; G11B 27/00
[52] U.S. Cl. ............................................ 386/52; 386/124
[58] Field of Search .............................. 386/1, 4, 33, 40, 386/46, 52, 53, 55, 64, 95, 124; 360/32, 13; 348/239, 391, 399, 576, 577, 578, 595; 358/531

[56] References Cited

U.S. PATENT DOCUMENTS

| | | | |
|---|---|---|---|
| 4,864,500 | 9/1989 | Ichihara . | |
| 5,287,187 | 2/1994 | Sato et al. | 348/239 |
| 5,638,133 | 6/1997 | Squier et al. | 348/578 |

FOREIGN PATENT DOCUMENTS

| | | |
|---|---|---|
| 0 249 661 | 12/1987 | European Pat. Off. . |
| 0 534 438 | 3/1993 | European Pat. Off. . |

OTHER PUBLICATIONS

Patent Abstracts of Japan vol. 15, No. 130 (E–1051), Mar. 29, 1991 & JP A 3–13078 (Toshiba), *Abstract.

*Primary Examiner*—Thai Tran
*Assistant Examiner*—Christopher Onuaku
*Attorney, Agent, or Firm*—Sughrue, Mion, Zinn Macpeak & Seas, PLLC

[57] ABSTRACT

A digital video signal processing apparatus to record or reproduce a video signal is provided in which a specific video signal is transformed by a user. The digital video signal processing apparatus includes a signal detector for detecting the level value of a specific signal selected from video data received, when a specific video detecting signal is applied, and outputting the video data and a region signal for indicating a detected region, a signal manipulator for transforming the level value of a signal in a region detected by the signal detector into the level value of a predetermined signal depending on a signal manipulation control signal, a data compressor for compressing digital video data including a specific signal transformed by the signal manipulator, a parity adder for adding a parity to the video data compressed by the data compressor, a modulator for modulating the video data, to which the parity has been added by the parity adder, and specific signal transformation control information data and recording the modulated data onto a recording medium, and a controller for applying the specific video detecting signal to the signal detector, applying the signal manipulation control signal to the signal manipulator, and applying the specific signal transformation control information data to the modulator. When a video signal is recorded or reproduced, all but a specific color desired by a user can be black or white processed, or a specific color desired by a user can be changed into another color.

5 Claims, 2 Drawing Sheets

DIGITAL VIDEO SIGNAL PROCESSING APPARATUS

BACKGROUND OF THE INVENTION

The present invention relates to a digital video signal processing apparatus, and more particularly, to a digital video signal processing apparatus which records or reproduces a video signal.

When a user generally records or reproduces a video signal using a digital video signal processing apparatus such as a digital video camera or a video cassette recorder, for special purposes, he or she needs to selectively transform the video signal to obtain artistic or special effects. However, in the prior art, there is no apparatus which selects, transforms and records only a specific signal or arbitrarily manipulates an image in order to apply the manipulated image to a screen.

SUMMARY OF THE INVENTION

It is an object of the present invention to provide a digital video signal processing apparatus for selecting a specific video signal, transforming the selected specific video signal into a signal desired by a user, and recording the transformed signal onto a recording medium.

Also, it is another object of the present invention to provide a digital video signal processing apparatus for reproducing a specific video signal recorded on a recording medium and transforming the reproduced signal into a signal which is desired by a user.

To accomplish the first object, there is provided a digital video signal processing apparatus comprising: a signal detector for detecting the level value of a specific signal selected from received video data, when a specific video detecting signal is applied, and outputting the video data and a region signal for indicating a detected region; a signal manipulator for transforming the level value of a signal in a region detected by the signal detector into the level value of a predetermined signal depending on a signal manipulation control signal; a data compressor for compressing digital video data including a specific signal transformed by the signal manipulator; a parity adder for adding a parity to the video data compressed by the data compressor; a modulator for modulating the video data, to which the parity has been added by the parity adder, and specific signal transformation control information data and recording the modulated data onto a recording medium; and a controller for applying the specific video detecting signal to the signal detector, applying the signal manipulation control signal to the signal manipulator, and applying the specific signal transformation control information data to the modulator.

It is preferable that the specific signal transformation control information data of the controller is recorded in an auxiliary region of the digital video standard.

To accomplish the second object, there is provided a digital video signal processing apparatus comprising: a demodulator for demodulating compressed digital video data and specific signal transformation control information data which are reproduced from a recording medium; an error corrector for correcting errors of the compressed digital video data and the specific signal transformation control information data which are demodulated by the demodulator; a data decompressor for decompressing the compressed digital video data whose error is corrected by the error corrector; a signal detector for detecting the level value of a specific signal selected from video data of the data decompressor when a specific video detecting signal is applied, and outputting the video data and a region signal for indicating a detected region; a signal manipulator for transforming the level value of a signal in a region detected by the signal detector into the level value of a predetermined signal depending on a signal manipulation control signal; a video signal composing portion for composing a composite video signal with the digital video data including transformed signal data output from the signal manipulator; and a controller for receiving the specific signal transformation control information data from the error corrector and allowing the video data from the decompressor to bypass the signal detector and the signal manipulator in response to a signal indicating a user's instruction to reproduce a video signal recorded on the recording medium without any transformation, and applying the specific video detecting signal to said signal detector and applying the signal manipulation control signal to said signal manipulator in response to a signal indicating a user's instruction to transform a specific video signal of the video signal recorded on the recording medium.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
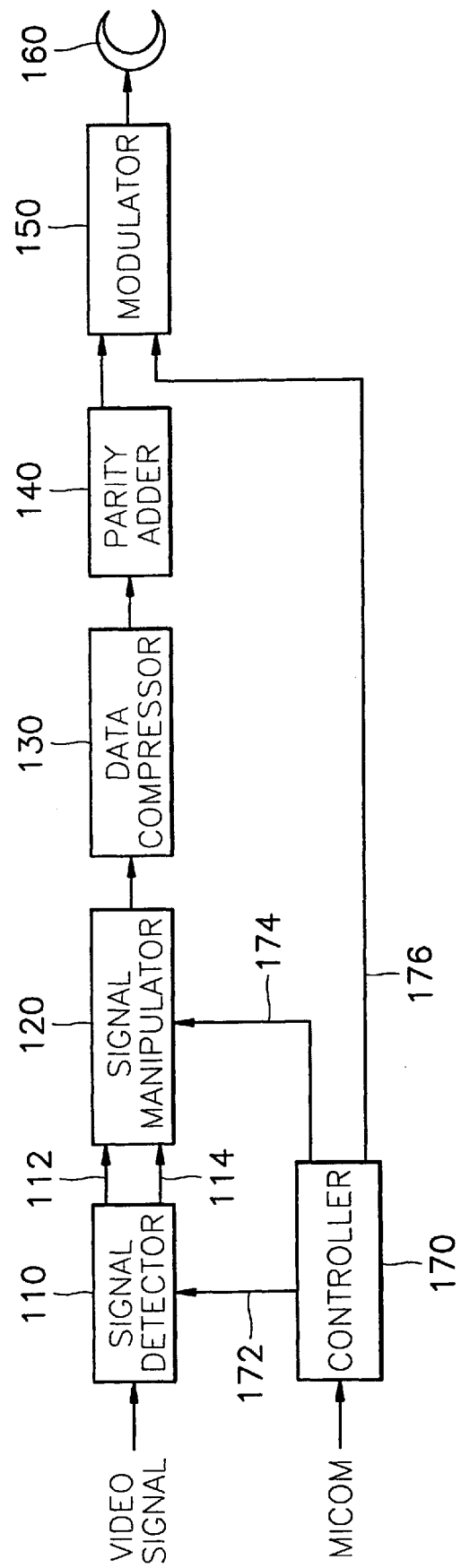
FIG. 1 is a block diagram of a digital video signal processing apparatus according to the present invention.

Referring to FIG. 1, a digital video signal processing apparatus includes a signal detector 110 for detecting the level value of a specific signal among received video data when a specific video detecting signal 172 is provided thereto and generating a region signal 112 for indicating the region of the detected signal, and outputting delayed video data 114, a signal manipulator 120 for converting the level value of the specific signal detected by the signal detector 110 into the level value of a desired signal depending on a signal manipulation control signal 174, a data compressor 130 for compressing the digital video data output from the signal manipulator 120, a parity adder 140 for adding a parity to video data compressed by the data compressor 130, a modulator 150 for modulating video data to which the parity is added in the parity adder 140 and specific signal transforming control information data 176 and recording the result onto a recording medium 160, and a controller 170 for applying the specific video detecting signal 172 to the signal detector 110, applying the signal manipulation control signal 174 to the signal manipulator 120, and applying the specific signal transformation control information data 176 to the modulator 150.

As shown in FIG. 1, a digital transformed video signal (i.e., video data) is input. If a user wants a specific signal, e.g., a yellow one, among video data to be changed into a pink one, a micom (not shown) commands the controller 170 to apply the specific video detecting signal 172 to the signal detector 110. The signal detector 110 detects the level value of a yellow signal selected from the received video data, depending on the specific video detecting signal 172 and generates the region signal 112 for indicating the region of detected signal, and delays the received video data by the length of time required for detecting the level value of the signal and outputs the delayed video data 114.

The signal manipulator 120 adds or subtracts a predetermined value to or from the level value of the yellow signal in the region detected by the signal detector 110, to convert the level value thereof into that of the desired pink signal.

The data compressor 130 compresses video data including a signal converted into the pink signal in the signal manipulator 120, by performing a data compression based on the discrete cosine transform (DCT) thereon. The parity adder 140 adds a parity, to be used for error correction, to the video data compressed by the data compressor 130. The modulator 150 modulates the video data to which the parity is added in the parity adder 140, and the specific signal transforming control information data 176, associated with the signal manipulation in the signal manipulator 120 and output by the controller 170, and records the modulated data onto the recording medium 160.

Figure 2:
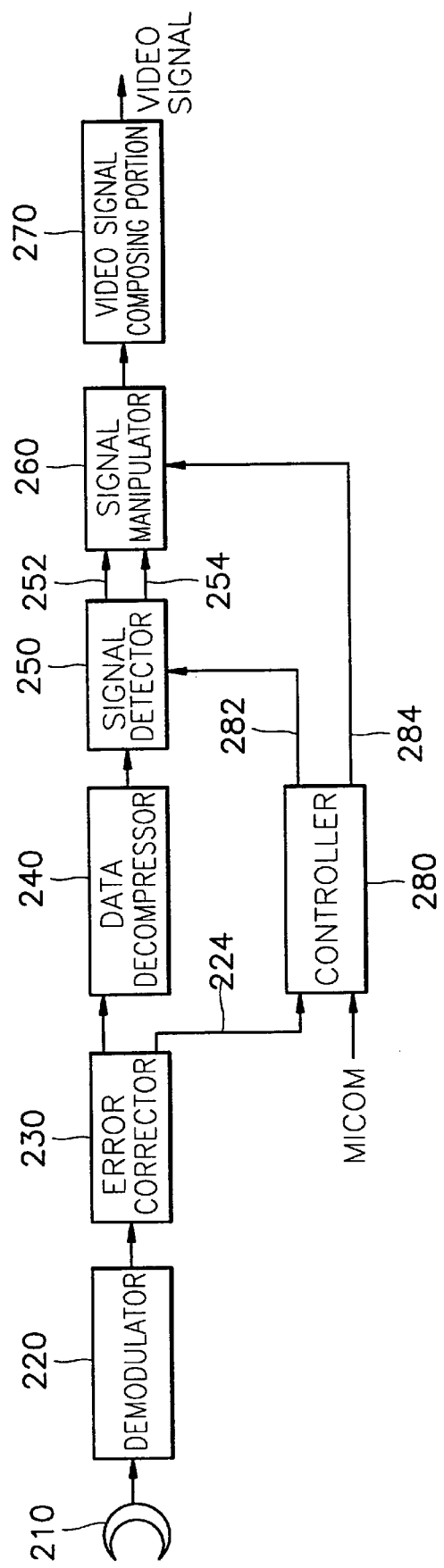
FIG. 2 is a block diagram of a digital video signal processing apparatus for reproducing a specific signal transforming digital video signal recorded by the apparatus of FIG. 1, according to the present invention.

FIG. 2 is a block diagram of a digital video signal processing apparatus for reproducing a specific signal transforming digital video signal recorded by the apparatus of FIG. 1, according to the present invention.

The digital video signal processing apparatus shown in FIG. 2 includes a demodulator 220 for demodulating compressed digital video data and specific signal transformation control information data reproduced from a recording medium 210, an error corrector 230 for correcting errors of the demodulated video data and the specific signal transformation control information data, a data decompressor 240 for decompressing the compressed digital video data, a signal detector 250 for detecting the level value of a specific signal from the video data and outputting delayed video data 254, a signal manipulator 260 for transforming the level value of the specific signal into the level value of a desired signal according to a signal manipulation control signal 284, a video signal composing portion 270 for composing luminance and color signals according to digital video data output from the signal manipulator 260, and a controller 280 for receiving specific signal transformation control information data 224 and outputting a specific video detecting signal 282 and a signal manipulation control signal 284 depending on the input of a key.

As shown in FIG. 2, the demodulator 220 demodulates compressed digital video data reproduced from the recording medium 210. The error corrector 230 corrects errors in the video data demodulated by the demodulator 220 and errors in the specific signal transformation control information data, included in an auxiliary data region of a recording format, which is also demodulated by the demodulator 220. The data decompressor 240 decompresses specific signal data error-corrected by the error corrector 230, e.g., compressed digital video data including a pink signal.

When a user reproduces a video signal recorded according to the auxiliary data without any transform, the controller 280 receives the specific signal transformation control information data 224 from the error corrector 230 and applies control signals to the signal detector 250 and the signal manipulator 260, so that the steps of detecting and manipulating a specific signal are not performed and are bypassed.

However, when the user wants a specific video signal to be converted during reproduction, a micom (not shown) commands the controller 280 to apply the specific video detecting signal 282 to the signal detector 250. In this case, the signal detector 250 detects the level value of a specific signal selected from received video data according to the specific video detecting signal 282. It then generates a region signal 252 for indicating a detected signal region, delays the received video data by the length of time required for detecting the level value of the signal and outputs the delayed video data 254. Also, the signal manipulator 260 transforms the level value of the specific signal in the detected region into the level value of the desired signal depending on a signal manipulation control signal 284.

The video signal composing portion 270 composes a composite video signal with video data output from the signal manipulator 260 and outputs the result.

According to the present invention described above, the color and brightness are manipulated so that when a video signal is recorded or reproduced, all but a specific color desired by the user can be black and white processed, or the specific color desired by the user can be changed into another color, or only the specific color desired by a user can be black and white processed while the rest is preserved with its original colors.

What is claimed is:

1. A digital video signal processing apparatus comprising:
    a signal detector for detecting a level value of a specific signal selected from received video data, when a specific video detecting signal is applied, and outputting the video data and a region signal for indicating a detected region;
    a signal manipulator for transforming a level value of a signal in a region detected by said signal detector into a level value of a predetermined signal depending on a signal manipulation control signal;
    a data compressor for compressing digital video data including a specific signal transformed by said signal manipulator;
    a parity adder for adding a parity to the video data compressed by said data compressor;
    a modulator for modulating the video data, to which the parity has been added by said parity adder, and specific signal transformation control information data and recording the modulated data onto a recording medium; and
    a controller for applying the specific video detecting signal to said signal detector, applying the signal manipulation control signal to said signal manipulator, and applying the specific signal transformation control information data to said modulator.

2. A digital video signal processing apparatus as claimed in claim 1, wherein the specific signal transformation control information data of said controller is recorded in an auxiliary region of a digital video standard.

3. A digital video signal processing apparatus comprising:
    a demodulator for demodulating compressed digital video data and specific signal transformation control information data which are reproduced from a recording medium;
    an error corrector for correcting errors of the compressed digital video data and the specific signal transformation control information data which are demodulated by said demodulator;
    a data decompressor for decompressing the compressed digital video data whose error is corrected by said error corrector;
    a signal detector for detecting a level value of a specific signal selected from video data of said data decompressor when a specific video detecting signal is applied, and outputting the video data and a region signal for indicating a detected region;

a signal manipulator for transforming a level value of a signal in a region detected by said signal detector into a level value of a predetermined signal depending on a signal manipulation control signal;

a video signal composing portion for composing a composite video signal with the digital video data including transformed signal data output from said signal manipulator; and a controller for receiving the specific signal transformation control information data from said error corrector and allowing the video data from said decompressor to bypass said signal detector and said signal manipulator in response to a signal indicating a user's instruction to reproduce a video signal recorded on the recording medium without any transformation, and applying the specific video detecting signal to said signal detector and applying the signal manipulation control signal to said signal manipulator in response to a signal indicating a user's instruction to transform a specific video signal of the video signal recorded on the recording medium.

4. A digital video signal processing apparatus comprising:

a signal detector for detecting a level value of a specific signal selected from received video data, when a specific video detecting signal is applied, and outputting the video data and a region signal for indicating a detected region;

a signal manipulator for transforming a level value of a signal in a region detected by said signal detector into a level value of a predetermined signal depending on a signal manipulation control signal;

a modulator for modulating the video data and specific signal transformation control information data and recording the modulated data onto a recording medium; and a controller for applying the specific video detecting signal to said signal detector, applying the signal manipulation control signal to said signal manipulator, and applying the specific signal transformation control information data to said modulator.

5. A digital video signal processing apparatus comprising:

receiving means for receiving video data and specific signal transformation control information data which are reproduced from a recording medium;

an error corrector for correcting errors of the received video data and the specific signal transformation control information data;

a signal detector for detecting a level value of a specific signal selected from the received video data when a specific video detecting signal is applied, and outputting the received video data and a region signal for indicating a detected region;

a signal manipulator for transforming a level value of a signal in a region detected by said signal detector into a level value of a predetermined signal depending on a signal manipulation control signal and outputting transformed signal data;

a video signal composing portion for composing a composite video signal including the received video data and the transformed signal data output from said signal manipulator; and a controller for receiving the specific signal transformation control information data from said error corrector and allowing the received video data to bypass said signal detector and said signal manipulator in response to a signal indicating a user's instruction to reproduce a video signal recorded on the recording medium without any transformation, and applying the specific video detecting signal to said signal detector and applying the signal manipulation control signal to said signal manipulator in response to a signal indicating a user's instruction to transform a specific video signal of the video signal recorded on the recording medium.

* * * * *